(12) United States Patent
Gaduski et al.

(10) Patent No.: US 10,974,769 B2
(45) Date of Patent: Apr. 13, 2021

(54) VEHICLE STRUCTURAL SYSTEMS FOR SORB IMPACT EVENTS

(71) Applicants: Michael W Gaduski, Rochester Hills, MI (US); Chris Sleiman, Windsor (CA); Rene R Zamarripa, Waterford, MI (US); Amandeep S Gill, Rochester Hills, MI (US); Scott E Zilincik, Troy, MI (US); Tusher M Phule, Auburn Hills, MI (US); Eric E Lund, Oxford, MI (US); Martin L Hilderth, Rochester, MI (US); Eric A Darin, Royal Oak, MI (US)

(72) Inventors: Michael W Gaduski, Rochester Hills, MI (US); Chris Sleiman, Windsor (CA); Rene R Zamarripa, Waterford, MI (US); Amandeep S Gill, Rochester Hills, MI (US); Scott E Zilincik, Troy, MI (US); Tusher M Phule, Auburn Hills, MI (US); Eric E Lund, Oxford, MI (US); Martin L Hilderth, Rochester, MI (US); Eric A Darin, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 84 days.

(21) Appl. No.: 16/541,839

(22) Filed: Aug. 15, 2019

(65) Prior Publication Data
US 2020/0223489 A1   Jul. 16, 2020

Related U.S. Application Data

(60) Provisional application No. 62/792,046, filed on Jan. 14, 2019.

(51) Int. Cl.
*B62D 21/15* (2006.01)
*B62D 25/20* (2006.01)
(Continued)

(52) U.S. Cl.
CPC ......... *B62D 25/2045* (2013.01); *B60G 7/001* (2013.01); *B62D 21/05* (2013.01);
(Continued)

(58) Field of Classification Search
CPC ..... B62D 25/025; B62D 21/157; B62D 27/02
(Continued)

(56) References Cited

U.S. PATENT DOCUMENTS

| 5,700,049 A * | 12/1997 | Shibata | B62D 24/02 296/187.09 |
|---|---|---|---|
| 6,616,220 B2 * | 9/2003 | Cheong | B62D 25/082 296/187.12 |

(Continued)

FOREIGN PATENT DOCUMENTS

JP    5871189 B2    3/2016

Primary Examiner — Joseph D. Pape
(74) Attorney, Agent, or Firm — Ralph E Smith

(57) ABSTRACT

A structural small overlap rigid barrier (SORB) joining bracket for a vehicle having an underbody hold-down assembly, a cowl side assembly, and a body mount assembly configured to connect a vehicle body to a vehicle frame includes a cowl side coupling first portion configured to couple to the cowl side assembly, and an underbody coupling second portion configured to couple to the underbody hold-down assembly and the body mount assembly. The SORB joining bracket couples and maintains structural integrity between the underbody hold-down assembly and the cowl side assembly, and couples with the body mount assembly to increase vehicle load capacity by providing a direct load path into the frame of the vehicle. A frame extension tube assembly creates additional strength and stiffness via stack-up with the SORB joining bracket.

15 Claims, 8 Drawing Sheets

(51) Int. Cl.

| | | |
|---|---|---|
| *B62D 27/02* | (2006.01) | |
| *B62D 21/05* | (2006.01) | |
| *B62D 21/06* | (2006.01) | |
| *B62D 23/00* | (2006.01) | |
| *B60G 7/00* | (2006.01) | |
| B62D 25/14 | (2006.01) | |
| B62D 25/08 | (2006.01) | |

(52) U.S. Cl.
CPC .......... *B62D 21/06* (2013.01); *B62D 21/152* (2013.01); *B62D 21/157* (2013.01); *B62D 23/005* (2013.01); *B62D 27/02* (2013.01); *B62D 27/026* (2013.01); *B60G 7/005* (2013.01); *B60G 2204/1224* (2013.01); *B60G 2204/148* (2013.01); *B60G 2204/416* (2013.01); *B60G 2206/016* (2013.01); *B60G 2206/124* (2013.01); *B62D 25/081* (2013.01); *B62D 25/14* (2013.01)

(58) Field of Classification Search
USPC .................................. 296/209, 187.12
See application file for complete search history.

(56) References Cited

U.S. PATENT DOCUMENTS

| | | |
|---|---|---|
| 8,353,380 B2 | 1/2013 | Schonberger et al. |
| 8,985,258 B1 | 3/2015 | Midoun et al. |
| 9,079,619 B2 | 7/2015 | Gupta et al. |
| 9,376,073 B2 | 6/2016 | Gupta et al. |
| 9,376,144 B2 | 6/2016 | Shaner et al. |
| 10,029,733 B1 | 7/2018 | Grattan |
| 10,189,503 B2 | 1/2019 | Grattan |
| 2002/0153719 A1 | 10/2002 | Taguchi |
| 2005/0248185 A1* | 11/2005 | Hayashi ................ B62D 24/02 296/193.07 |
| 2009/0146462 A1 | 6/2009 | Sato et al. |
| 2012/0049571 A1 | 3/2012 | Katou et al. |

* cited by examiner

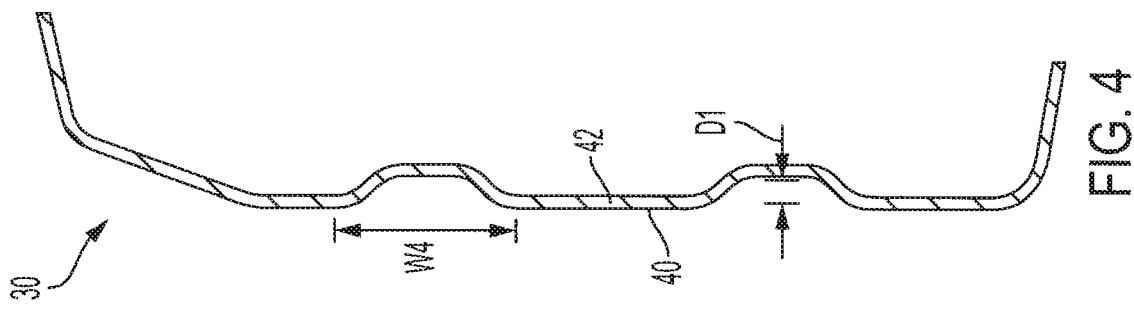
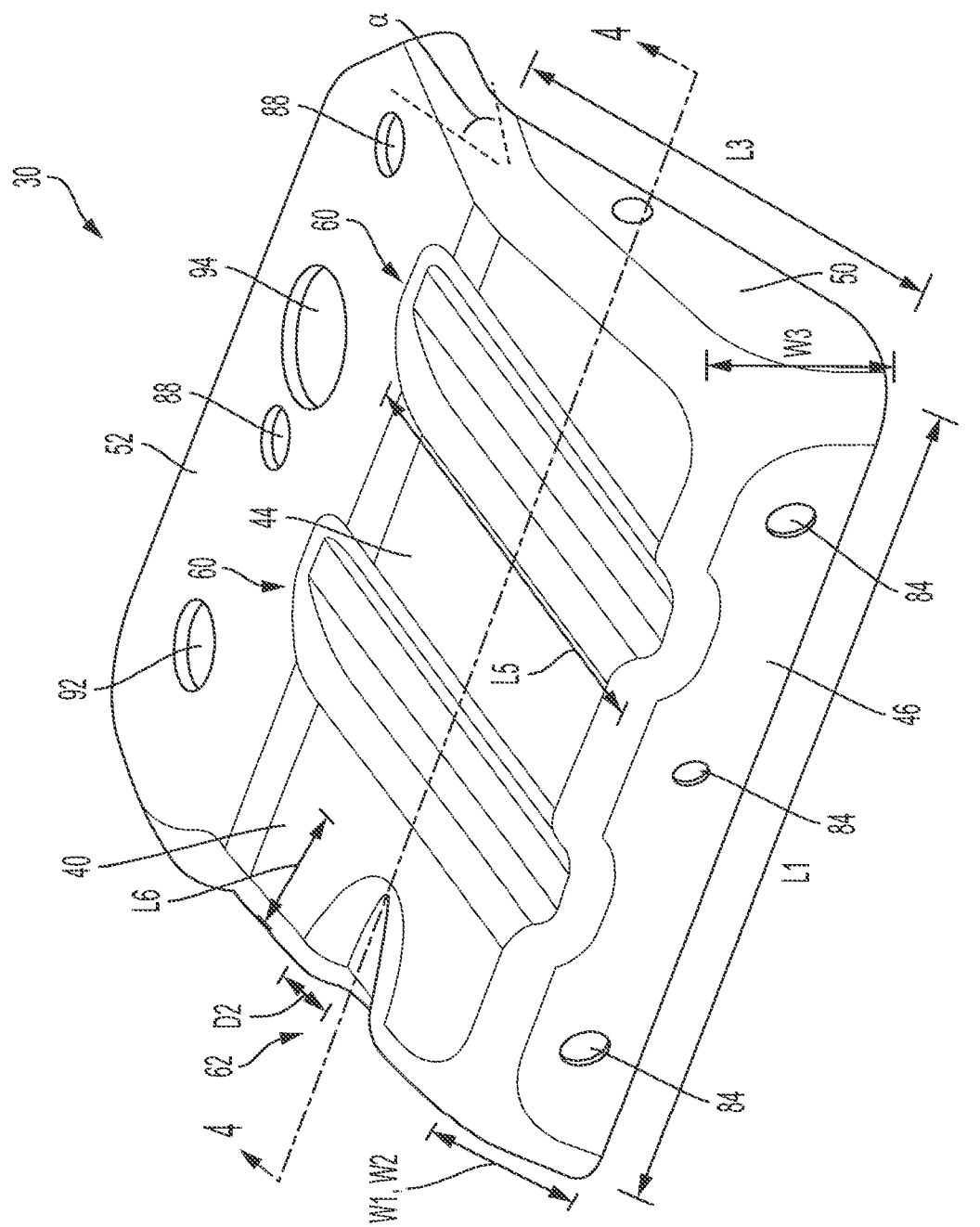

VEHICLE STRUCTURAL SYSTEMS FOR SORB IMPACT EVENTS

CROSS REFERENCE TO RELATED APPLICATION

This application claims the benefit of U.S. Provisional Application No. 62/792,046, filed Jan. 14, 2019, the contents of which are incorporated in their entirety by reference thereto.

FIELD

The present application relates generally to vehicle structural systems and, more particularly, to vehicle structural systems to reduce potential occupant compartment intrusion in frontal impacts.

BACKGROUND

Some vehicles include impact protection structure features to absorb energy from an impact event to protect vehicle passengers. In a small overlap impact event, a large amount of the impact is typically directed outboard of the main energy absorbing vehicle structures, and front portions of the vehicle may deform. Thus, while such impact protection structures do work well for their intended purpose, it is desirable to provide continuous improvement in the relevant art.

SUMMARY

In accordance with one example aspect of the invention, a structural small overlap rigid barrier (SORB) joining bracket for a vehicle having an underbody hold-down assembly, a cowl side assembly, and a body mount assembly configured to connect a vehicle body to a vehicle frame is provided. In one example implementation, the SORB joining bracket includes a cowl side coupling first portion configured to couple to the cowl side assembly, and an underbody coupling second portion configured to couple to the underbody hold-down assembly and the body mount assembly. The SORB joining bracket couples and maintains structural integrity between the underbody hold-down assembly and the cowl side assembly, and couples with the body mount assembly to increase vehicle load capacity by providing a direct load path into the frame of the vehicle.

In addition to the foregoing, the described SORB joining bracket may have one or more of the following features: a main body panel extending between the first and second portions; a forward flange extending from the main body panel between the first and second portions to provide increased structural rigidity; a rearward flange extending from the main body panel between the first and second portions to provide further increased structural rigidity; and wherein the first portion is a side flange extending from the main body panel, and the second portion is an underbody flange extending from the main body panel.

In addition to the foregoing, the described SORB joining bracket may have one or more of the following features: wherein the underbody flange includes a first aperture configured to receive a first fastener for coupling the underbody flange to the underbody hold-down assembly, and a second aperture configured to receive a second fastener for coupling the underbody flange to the body mount assembly; wherein the side flange includes a plurality of apertures configured to each receive a fastener for coupling the side flange to the cowl side assembly; and a first directional stiffening bead formed in the main body panel.

In accordance with another example aspect of the invention, a vehicle is provided. In one example implementation, the vehicle includes a structural frame including a side frame rail, a wheel assembly, and a frame extension tube (FET) assembly. The FET assembly includes a tubular member coupled to the side frame rail and extending outboard thereof rearward of the wheel assembly, the tubular member configured to create a load carrying path for the wheel assembly into the structural frame, and a tension gusset coupled between the side frame rail and the tubular member to create an additional load carrying path into the structural frame.

In addition to the foregoing, the described vehicle may have one or more of the following features: wherein the tubular member is a one-piece tube; wherein the tubular member is generally rectangular and includes a front wall, a rear wall, a bottom wall, and a top wall; wherein a first end of the tubular member extends through a first aperture formed through an outboard side of the side frame rail; wherein the first end of the tubular member is welded to the outboard side of the side frame rail; wherein the front wall faces toward a front of the vehicle, and wherein the front wall is not welded to the outboard side of the side frame rail to facilitate the tubular member undergoing plastic deformation during a small overlap rigid barrier impact event; wherein the first end of the tubular member extends through a second aperture formed through an inboard side of the side frame rail such that the tubular member extends completely through the side frame rail; and wherein the front wall, the rear wall, the bottom wall, and the top wall are all welded to the inboard side of the side frame rail.

In accordance with another example aspect of the invention, a vehicle is provided. In one example implementation, the vehicle includes a structural frame including a side frame rail, a body, a wheel assembly, an underbody hold-down assembly coupled to the structural frame, a body mount assembly connecting the body to the structural frame, a cowl side assembly, a structural small overlap rigid barrier (SORB) joining bracket, and a frame extension tube (FET) assembly. The SORB joining bracket includes a cowl side coupling first portion coupled to the cowl side assembly, and an underbody coupling second portion coupled to the underbody hold-down assembly and the body mount assembly. The SORB joining bracket couples and maintains structural integrity between the underbody hold-down assembly and the cowl side assembly, and couples with the body mount assembly to increase vehicle load capacity by providing a direct load path into the structural frame of the vehicle. The FET assembly includes a tubular member coupled to the side frame rail and extending outboard thereof rearward of the wheel assembly, the tubular member configured to create a load carrying path for the wheel assembly into the structural frame, and a tension gusset coupled between the side frame rail and the tubular member to create an additional load carrying path into the structural frame.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

BRIEF DESCRIPTION OF DRAWINGS

FIG. 3 is a top perspective view of the example SORB joining bracket shown in FIG. 1, in accordance with the principles of the present application;

FIG. 4 is a cross-sectional view of the example SORB joining bracket shown in FIG. 3 and taken along line 4-4, in accordance with the principles of the present application;

DESCRIPTION

Described herein is a vehicle body structure configured to provide structural reinforcement in right and left small overlap rigid barrier (SORB) impacts. The vehicle body structure includes a SORB joining bracket that couples and maintains the structural integrity between an underbody hold-down assembly and a cowl side assembly. The SORB joining bracket is advantageously interlocked with a body mount assembly, thereby increasing load capacity of the body system and providing a direct load path into the frame of the vehicle. Directional stiffening beads provide additional stiffness and strength to efficiently transfer load between the cowl side assembly and the underbody hold-down assembly. Additionally, a frame extension tube assembly is provided with a high strength member and load capacity gusset that extend outboard of the frame to establish a direct transfer load path thereto from outboard loading devices such as wheels, front suspension corners, and barriers.

Figure 1:
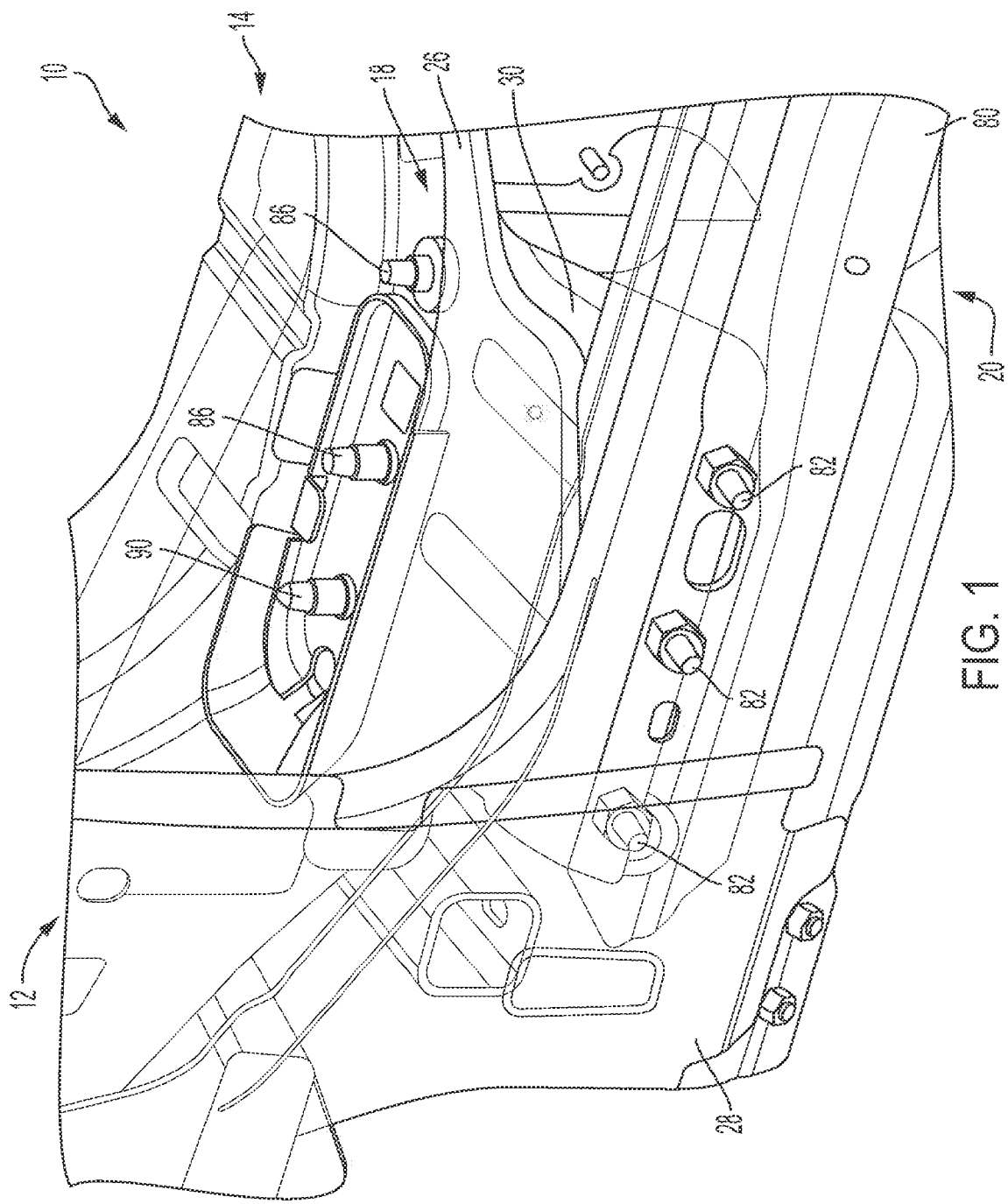
FIG. 1 is a perspective view of a portion of an example vehicle with a SORB joining bracket joining an underbody hold-down assembly, a cowl side assembly, and a body mount assembly, and a frame extension tube assembly, in accordance with the principles of the present application.
Figure 2:
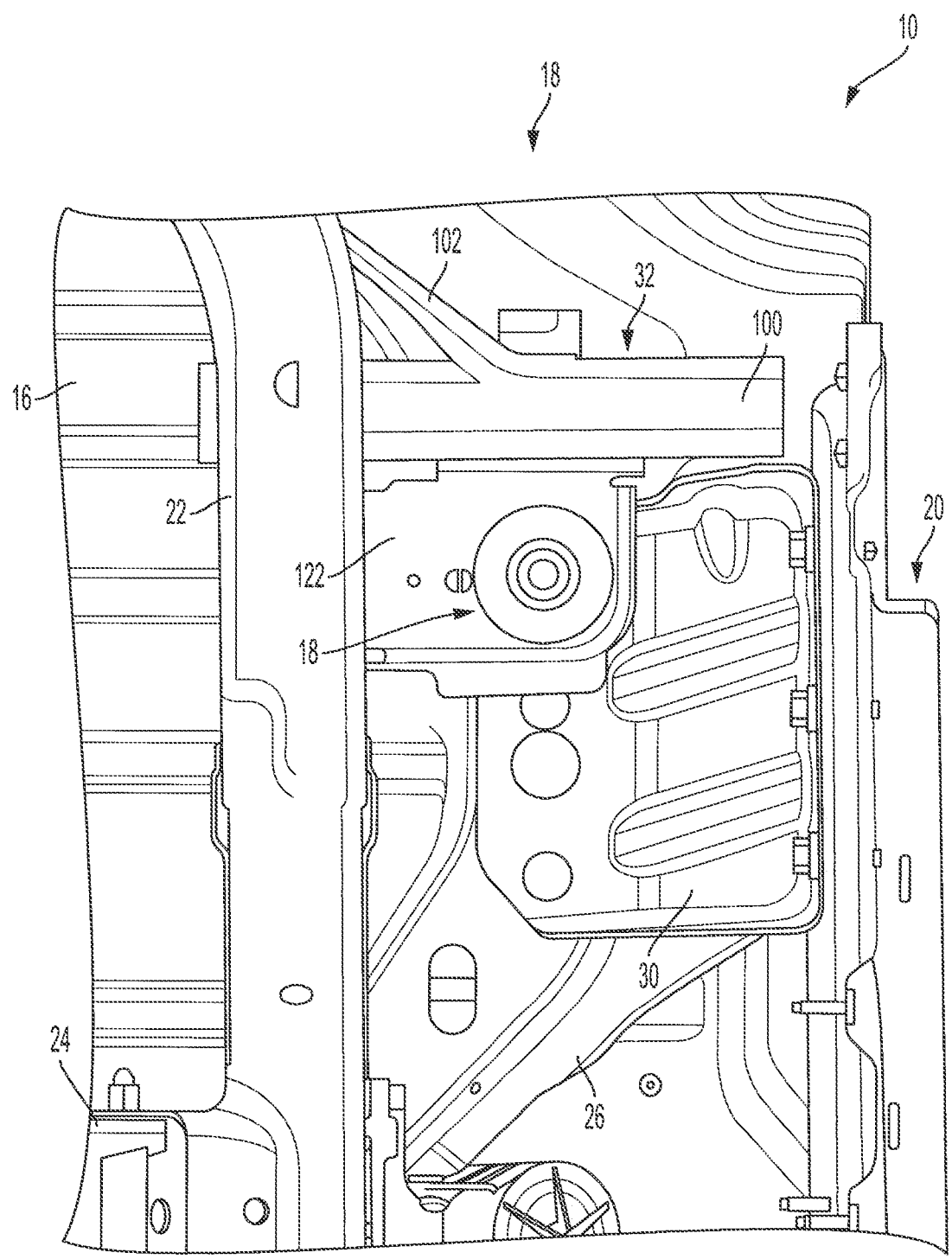
FIG. 2 is a bottom view of the example vehicle, frame extension tube assembly, and SORB joining bracket shown in FIG. 1, in accordance with the principles of the present application.

With reference to FIGS. 1 and 2, an example portion of a vehicle is generally shown and indicated at reference numeral 10. In the example embodiment, the vehicle 10 is configured to maintain structural integrity during impact or collision events, particularly during SORB testing. As such, the vehicle 10 is configured to provide desired interaction of body and frame systems to thereby reduce or prevent structural intrusion from front suspension corners that can affect lower foot/leg injury metrics for drivers and front passengers.

In the example embodiment, the vehicle 10 is a body on frame vehicle and generally includes a frame 12, a wheel assembly (not shown), an underbody hold-down assembly 14, a floor panel 16, body mount assemblies 18, and a cowl side assembly 20. It will be appreciated that only one side (vehicle left side) is shown and that the same or similar features are present on the other side (vehicle right side). The frame 12 generally includes side frame rails 22 (only one shown) that extend in a generally fore-aft direction of the vehicle 10, and cross frame rails 24 (only one shown) that extend in a generally cross-car direction (i.e., perpendicular to the fore-aft direction).

In the example embodiment, the underbody hold-down assembly 14 includes an underbody hold-down panel 26 that extends generally vehicle fore-aft and is configured to provide structural support for various vehicle components. The floor panel 16 is disposed on top of underbody hold-down panel 26 generally parallel to the ground and is configured to partially define a passenger or occupant compartment (not shown). The body mount assemblies 18 are coupled between the frame 12 and underbody hold-down assembly 14 to facilitate the connection of the vehicle body to the frame 12. The cowl side assembly 20 includes cowl side panels 28 that extend generally vertically between vehicle fore-aft and is configured to define side supports or structure of the vehicle 10.

Figure 5:
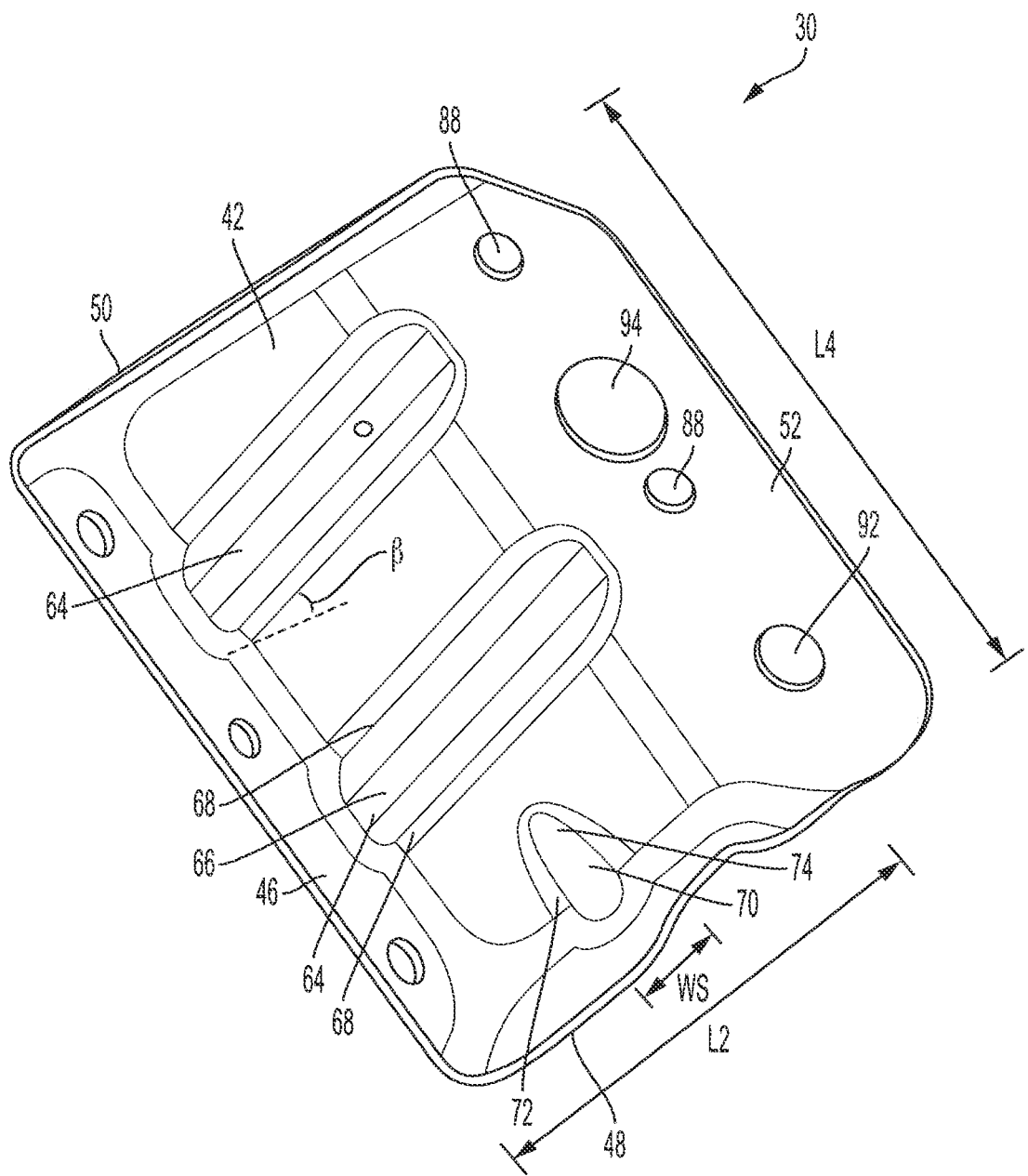
FIG. 5 is a bottom perspective view of the example SORB joining bracket shown in FIG. 3, in accordance with the principles of the present application.
Figure 6:
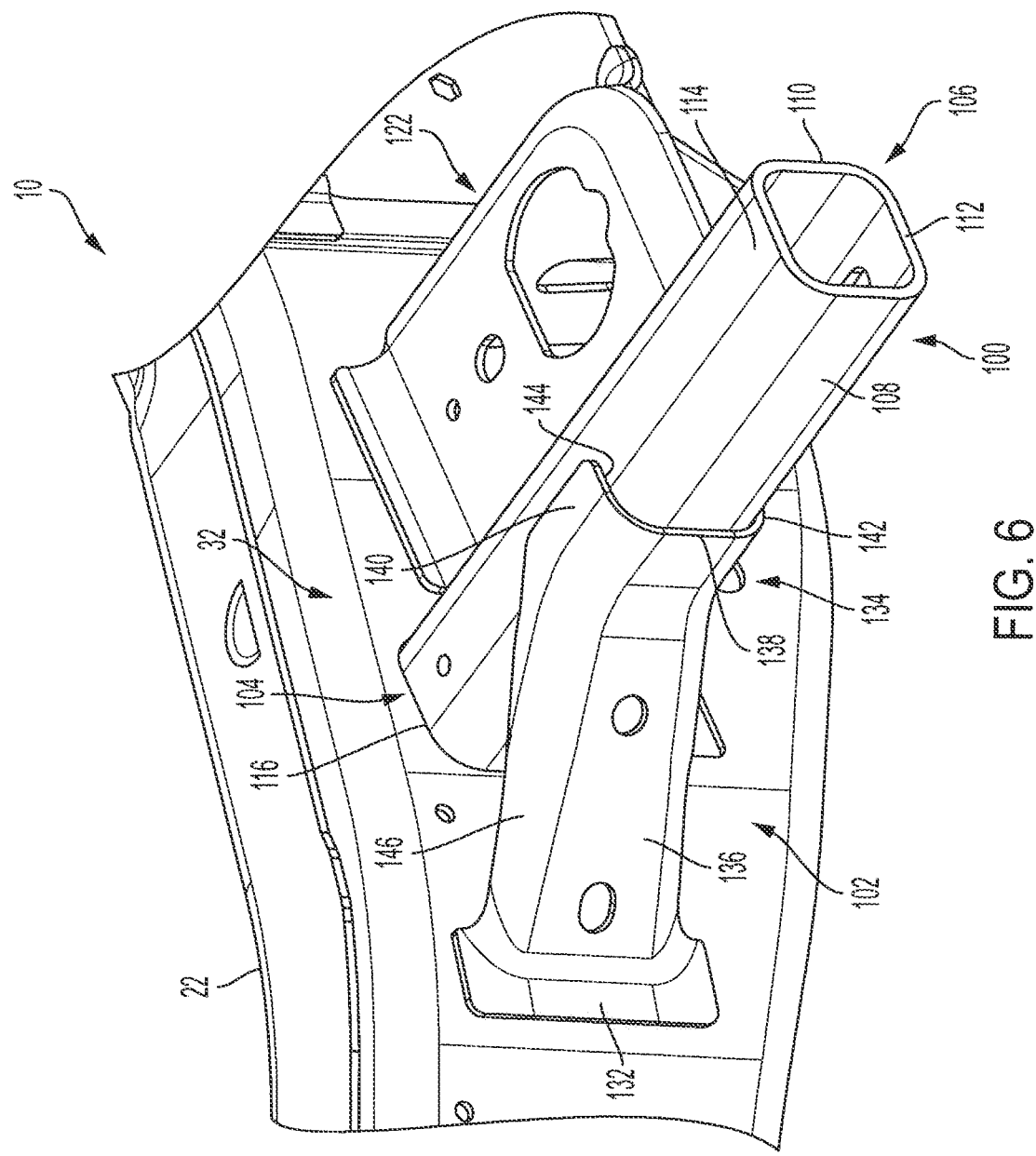
FIG. 6 is a top front perspective view of the example frame extension tube assembly shown in FIGS. 1 and 2, in accordance with the principles of the present application.
Figure 7:
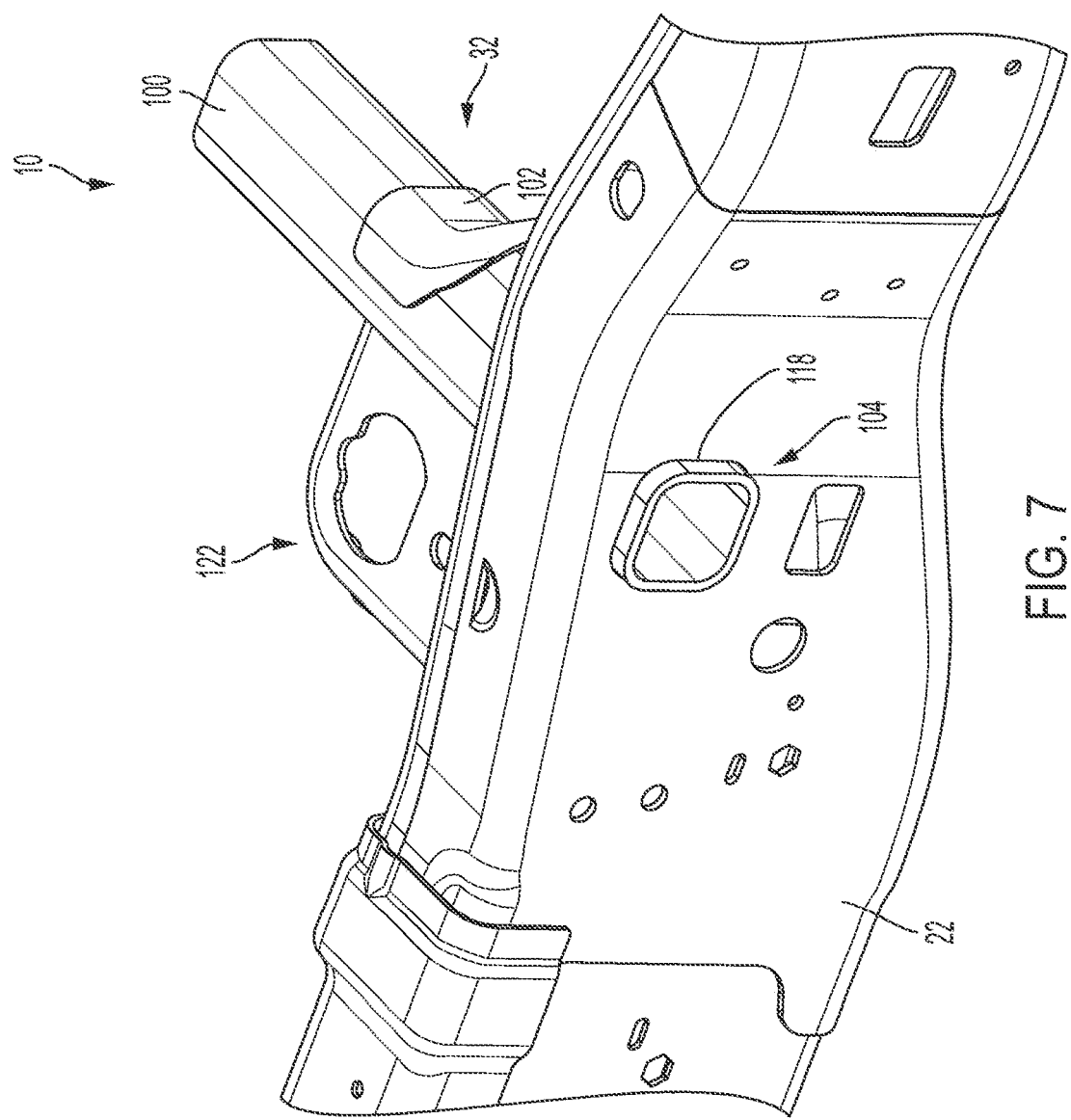
FIG. 7 is another top front perspective view of the example frame extension tube assembly shown in FIG. 6, in accordance with the principles of the present application.

With reference to FIGS. 2 and 6, in the illustrated example, in order to prevent intrusion into the lower leg area of the occupant compartment, particularly during SORB impacts, a SORB joining bracket 30 and a high strength frame extension tube (FET) assembly 32 are provided. In general, the joining bracket 30 (FIGS. 1-5) is configured to maintain structural integrity between the underbody hold-down assembly 14 and the cowl side assembly 20, while interlocking with one body mount assembly 18 to increase load capacity of the body system. In general, the FET assembly 32 (FIGS. 2, 6-9) extends outboard from the frame 12 to create a direct transfer load path from outboard loading devices (e.g., wheel, wheel assembly) during a SORB impact.

With reference now to FIGS. 1-5, the SORB joining bracket 30 will be described in more detail. As briefly discussed above, the SORB joining bracket 30 is coupled between the underbody hold-down assembly 14 and the cowl side assembly 20 to maintain structural integrity therebetween and prevent structural intrusion into the occupant compartment during SORB impacts. Advantageously, the joining bracket 30 is interlocked with the body mount assembly 18 to provide a direct load path into the frame 12. As such, if any primary mechanical fasteners are sheared under impact loading, the integration of the joining bracket 30 with the body mount assembly 18 is able to provide continued load carrying capacity in the immediate area, thereby resulting in reduced structural intrusion from wheel or front suspension interaction that may affect lower foot/leg injury metrics for drivers and front passengers.

In the example embodiment, the SORB joining bracket 30 is a generally rectangular sheet-like component having an upper surface 40 and an opposite lower surface 42. As shown in FIGS. 3 and 5, the joining bracket 30 generally includes a main body panel 44, a side flange 46, a forward flange 48, a rearward flange 50, and an underbody flange 52. The forward and rearward flanges 48, 50 advantageously provide structural rigidity to the joining bracket 30. In one embodiment, the joining bracket 30 is fabricated from high strength steel (e.g., DP 780) with a predetermined gage. In one example, the gage is between 2.0 mm and 4.0 mm or between approximately 2.0 mm and approximately 4.0 mm. In other examples, the gage is 3.0 mm or approximately 3.0 mm.

With additional reference to FIGS. 3-5, in the example embodiment, side flange 46 is formed with a length 'L1' and a width 'W1', forward flange 48 is formed with a length 'L2' and a decreasing width 'W2' extending from the side flange 46 to the underbody flange 52, and rearward flange 50 is formed with a length 'L3' and a decreasing width 'W3' extending from the side flange 46 to the underbody flange 52. The underbody flange 52 is formed with a length 'L4' and is oriented at an angle 'α' relative to the main body panel 44.

In one example, length 'L1' is between approximately 125 mm and approximately 325 mm or between 125 mm and 325 mm. In another example, length 'L1' is 225 mm or approximately 225 mm. In one example, width 'W1' is between approximately 25 mm and approximately 55 mm, or between 25 mm and 55 mm. In another example, width 'W1' is 40 mm or approximately 40 mm.

In one example, length 'L2' is between approximately 90 mm and approximately 290 mm, or between 90 mm and 290 mm. In another example, length 'L2' is 190 mm or approximately 190 mm. In one example, width 'W2' has a maximum between approximately 25 mm and approximately 55 mm, or between 25 mm and 55 mm. In another example, width 'W2' has a maximum of 40 mm or approximately 40 mm. In the example embodiment, the width 'W2' varies between the maximum and a minimum of zero mm.

In one example, length 'L3' is between approximately 90 mm and approximately 290 mm, or between 90 mm and 290 mm. In another example, length 'L3' is 190 mm or approximately 190 mm. In one example, width 'L3' has a maximum between approximately 25 mm and approximately 55 mm, or between 25 mm and 55 mm. In another example, width 'W3' has a maximum of 40 mm or approximately 40 mm. In the example embodiment, the width 'W3' varies between the maximum and a minimum of zero mm.

In one example, length 'L4' is between approximately 150 mm and approximately 350 mm or between approximately 150 mm and 350 mm. In another embodiment, length 'L4' is 250 mm or approximately 250 mm. In one example, angle 'α' is between approximately 10° and approximately 50° or between 10° and 50°.

Further, in the example embodiment, the main body panel 44 can include one or more lateral stiffening ribs or beads 60 and longitudinal stiffening ribs or beads 62 configured to provide further stiffening and structural rigidity to efficiently transfer load between the underbody hold-down assembly 14 and the cowl side assembly 20. The directional stiffening beads 60, 62 may be formed, for example, via a stamping operation.

In the illustrated example, each lateral stiffening bead 60 extends generally cross-car and defines a protrusion 64 (FIG. 5) formed in the main body panel 44 defined at least partially by a stop wall 66 extending between opposed side walls 68. In the illustrated example, lateral stiffening beads 60 extend from the side flange 46 to the underbody flange 52 and are configured to facilitate strengthening the side flange 46 to increase load transfer capacity. In other examples, lateral stiffening beads 60 extend only a partial distance between the side flange 46 to the underbody flange 52. While two lateral stiffening beads 60 are illustrated, it will be appreciated that joining bracket 30 may include any suitable number of lateral stiffening beads (e.g., one or three).

In the example embodiment, the longitudinal stiffening bead 62 extends generally vehicle fore-aft and defines a protrusion 70 (FIG. 5) formed in the main body panel 44 defined at least partially by converging opposed side walls 72, 74. In the illustrated example, the longitudinal stiffening bead 62 extends from the forward flange 48 generally toward a rear of the vehicle. While a single stiffening bead 62 is illustrated, it will be appreciated that joining bracket 30 may include any suitable number of longitudinal stiffening beads 62.

In the example embodiment shown in FIGS. 3-5, lateral stiffening beads 60 are formed with a depth 'D1', a width 'W4', a length 'L5', and an orientation at an angle 'β' relative to the cross-car axis. In one example, depth 'D1' is between approximately 2.0 mm and approximately 10 mm, or between 2.0 mm and 10 mm. In another example, depth 'D1' is 6.0 mm or approximately 6.0 mm. In one example, width 'W4' is between approximately 20 mm and approximately 60 mm, or between 20 mm and 60 mm. In another example, width 'W4' is 40 mm or approximately 40 mm. In one example, length 'L5' is between approximately zero mm and approximately 140 mm or between zero mm and 140 mm. Moreover, although illustrated as having the same or similar lengths, multiple lateral stiffening beads 60 may have differing lengths. In one example, angle 'β' is between approximately 0° and approximately 45° or between 0° and 45°.

In the example embodiment, longitudinal stiffening beads 62 are formed with a depth 'D2', a varying width 'W5', and a length 'L6'. In one example, depth 'D2' is between approximately 2.0 mm and approximately 10 mm, or between 2.0 mm and 10 mm. In another example, depth 'D2' is 6.0 mm or approximately 6.0 mm. In one example, width 'W5' has a converging width between approximately zero mm and approximately 30 mm or between zero mm and 30 mm. In one example, length 'L6' is between approximately 10 mm and approximately 130 mm or between 10 mm and 130 mm.

With continued reference to FIGS. 1 and 2, as discussed herein, joining bracket 30 is utilized to structurally join the underbody hold-down assembly 14, the body mount assembly 18, and the cowl side assembly 20, More particularly, in the illustrated example, the side flange 46 is coupled to an inner side surface of a cowl side member 80 and/or the cowl side panel 28 of the cowl side assembly 20. In one example, cowl side member 80 is a sill reinforcement configured to secure the SORB joining bracket 30 to a sill joint. In the example embodiment, the coupling is achieved with a plurality of fasteners 82 (e.g., bolts) extending through a plurality of apertures 84 formed in the joining bracket side flange 46. However, it will be appreciated that side flange 46 can be coupled to the cowl side assembly 20 by any suitable means such as, for example, welding or structural adhesives.

In the example embodiment, the underbody flange 52 is coupled to a lower surface of the underbody hold-down panel 26 via a plurality of fasteners 86 (e.g., bolts) extending through a plurality of apertures 88 formed in the underbody flange 52. However, it will be appreciated that underbody flange 52 can also be coupled to the underbody hold-down assembly 14 by any suitable means such as, for example, welding or structural adhesives.

Moreover, in the example embodiment, the underbody flange 52 is further coupled to the body mount assembly 18 via a body mount fastener 90 (e.g., bolt) extending through an aperture 92 formed in the underbody flange 52. An additional aperture 94 is formed in the underbody flange 52 and is configured to receive a portion of the underbody hold-down assembly 14 therethrough (e.g., for locating, providing further structural integrity therebetween, etc.). As discussed herein, the coupling between the SORB joining bracket 30 and the body mount assembly 18 is configured to increase the load capacity of the body system by providing a direct load path into the frame 12 via the SORB joining bracket 30.

As shown in FIG. 1, fasteners 86, 90 also extend through a reinforcement underbody hold-down plate 96 of the underbody hold-down assembly 14, and fasteners 86 extend through a tapping plate 98 of the underbody hold-down assembly 14. In one example, tapping plate 98 is coupled (e.g., welded) to reinforcement plate 96 and underbody hold-down panel 26, and the reinforcement plate 96 is also coupled to the underbody hold-down panel 26.

With reference now to FIGS. 2 and 6-9, the high strength FET assembly 32 will be described in more detail. As briefly discussed above, in general, the FET assembly 32 extends outboard from the frame 12 and is configured to create a direct transfer load path from outboard loading devices (e.g., wheel) during a SORB impact event. Advantageously, in the example embodiment, the FET assembly 32 is coupled to the frame 12 via a double shear joint to provide increased resistance to bending while carrying load. Moreover, the FET assembly 32 utilizes a one-piece tube design and omits welding on the outboard forward face of the tube in order to sustain plastic deformation instead of sudden fracture. A load capacity gusset adds additional strength to the frame system by creating an additional load carrying path.

In the example embodiment, the FET assembly 32 generally includes a structural member or post 100 and a tension gusset 102. As illustrated, the structural post 100 is generally tubular and includes a first end 104 and an opposite second end 106. In the example embodiment, the structural post 100 has a substantially square or rectangular cross-section such that structural post 100 includes a front wall 108, a rear wall 110, a bottom wall 112, and a top wall 114. The front wall 108 is configured to face generally toward a front of the vehicle, the rear wall 110 is configured to face generally toward a rear of the vehicle, the bottom wall 112 is configured to face generally toward the ground, and the top wall 114 is configured to generally face in a direction opposite of bottom wall 112. However, it will be appreciated that structural post 100 can have any suitable cross-section such as, for example, circular or hexagonal.

In the example embodiment, the structural post first end 104 extends through an outboard aperture 116 (FIG. 6) and an inboard aperture 118 (FIG. 7) formed in the side frame rail 22. The structural post first end 104 is coupled to the side frame rail 22 at both the outboard aperture 116 and the inboard aperture 118. Specifically, at the outboard aperture 116, structural post 100 is welded to the side frame rail 22 with a double shear joint at the rear wall 110, the bottom wall 112, and the top wall 114 to provide increased resistance to bending while carrying load. Moreover, welding is omitted on the front wall 108 of the structural post 100 to facilitate plastic deformation of the post during a SORB impact, rather than a sudden fracture.

Figure 8:
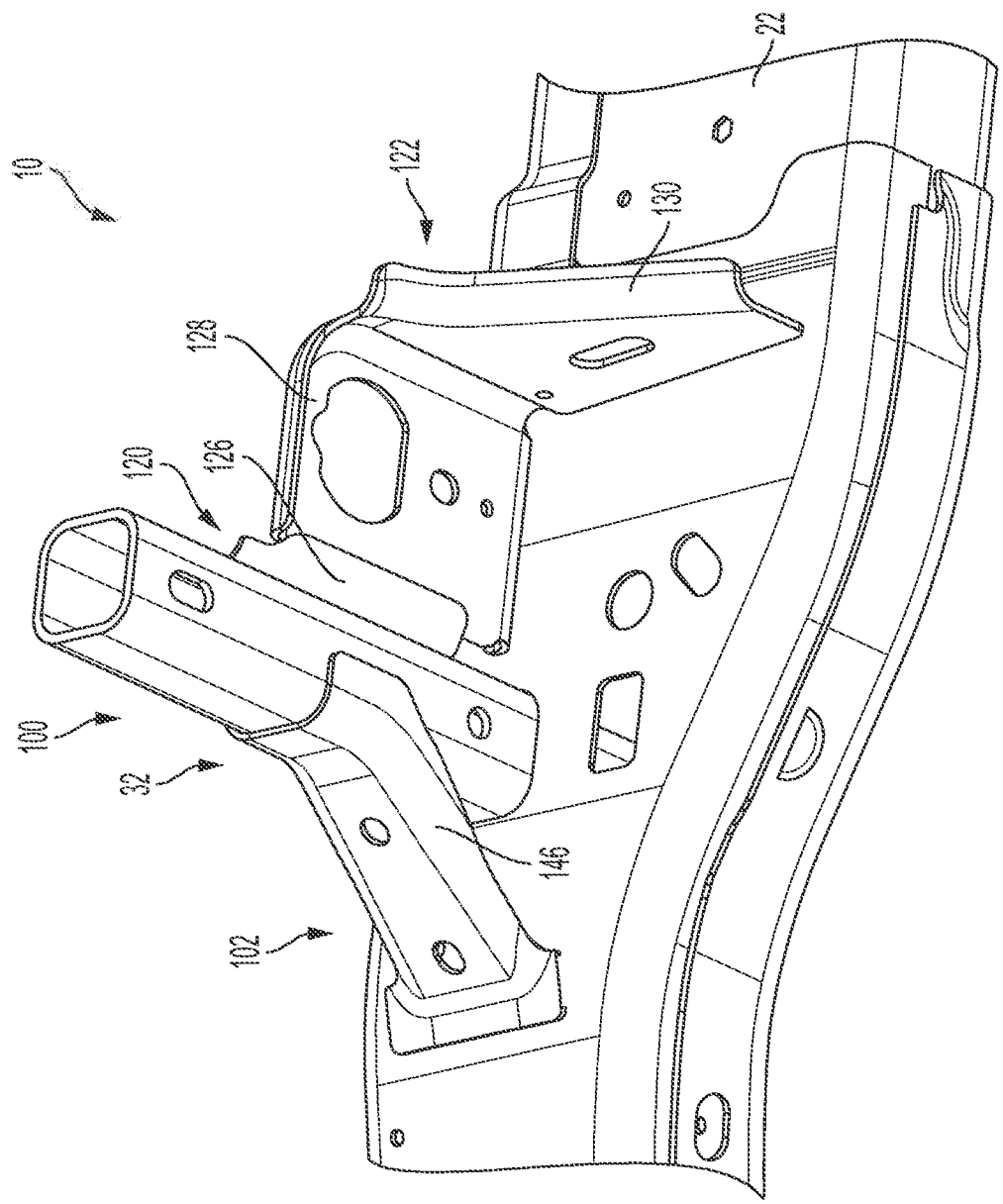
FIG. 8 is a bottom front perspective view of the example frame extension tube assembly shown in FIG. 6, in accordance with the principles of the present application.
Figure 9:
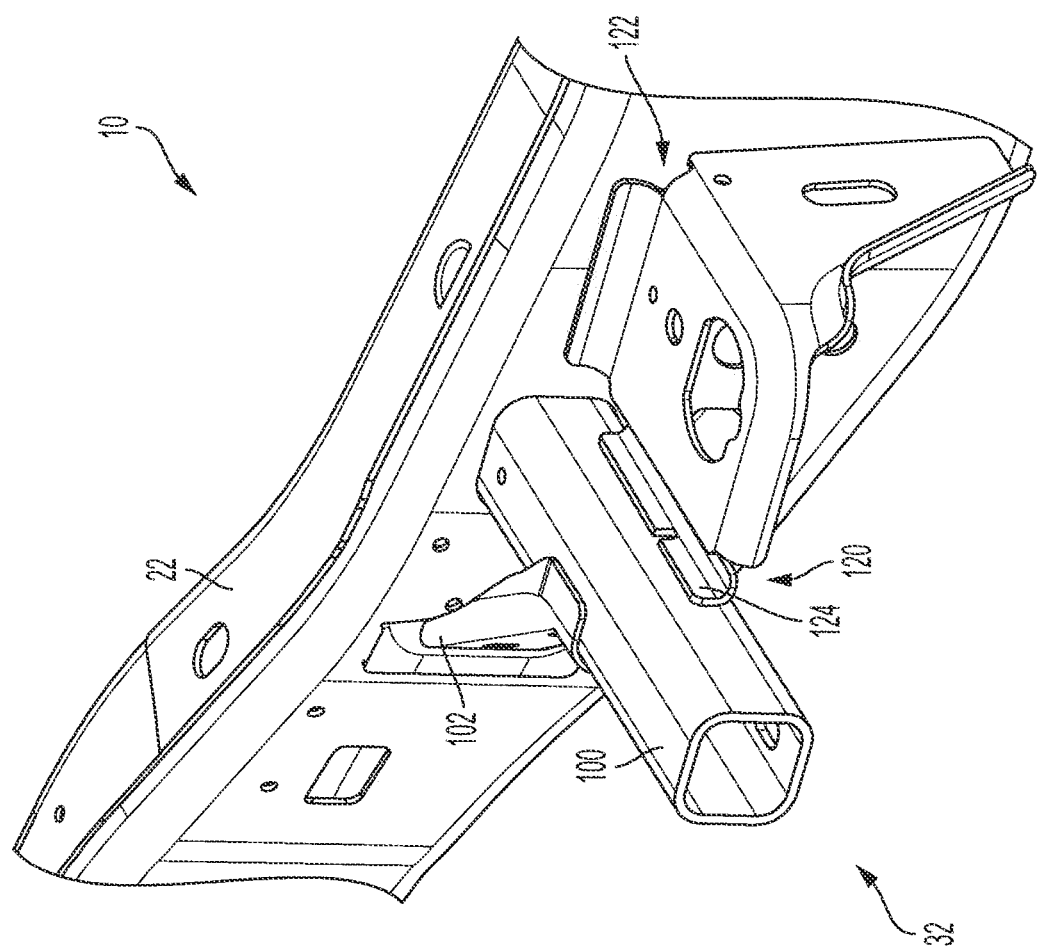
FIG. 9 is a top rear perspective view of the example frame extension tube assembly shown in FIG. 6, in accordance with the principles of the present application.

Further, at the inboard aperture 118, structural post 100 is welded to the side frame rail 22 with a double shear joint at the front wall 108, the rear wall 110, the bottom wall 112, and the top wall 114 to further provide increased resistance to bending while carrying load. Additionally, as shown in FIGS. 8 and 9, the structural post 100 is further secured via a connector plate 120 to a perch mount 122 of the body mount assembly 18. In one example, perch mount 122 is an A-pillar bracket configured to additionally support an A-pillar mount (not shown).

In the example embodiment, the connector plate 120 is generally L-shaped and includes a first flange 124 coupled to the structural post rear wall 110, and a second flange 126 coupled to the perch mount 122. In the example illustration, connector plate 120 is coupled to the structural post 100 and perch mount 122 via welding. However, it will be appreciated that connector plate 120 can be coupled to structural post 100 and perch mount 122 via other coupling methods such as, for example, structural adhesives or fasteners. Further, as shown in FIG. 8, the perch mount 122 includes a lateral plate 128 configured to couple to the connector plate 120 and the side frame rail 22, and a vertical plate 130 coupled to the side frame rail 22.

In the example embodiment, tension gusset 102 is configured to add additional strength to the frame 12 by creating an additional load carrying path. As illustrate, the tension gusset 102 generally includes a first end 132, an opposite second end 134, and an intermediate portion 136 extending therebetween. The first end 132 is coupled to an outboard surface of the side frame rail 22, for example, via welding. The second end 134 is generally C-shaped an includes a first wall 138 extending between opposed second and third walls 140, 142. As shown in FIGS. 8 and 9, the first wall 138 is coupled to the tube front wall 108, and the opposed second and third walls 140, 142 are respectively coupled to the tube bottom and top surfaces 112, 114. In one example, a perimeter edge 144 of the gusset second end 134 is welded to the structural post 100. Moreover, in the illustrated example, the gusset intermediate portion 136 includes opposed flanges 146 extending outwardly from a base member 148 to provide increased strength to the tension gusset 102.

Accordingly, in the example embodiment, the FET assembly 32 is located in a path between the vehicle wheel and predetermined structural intrusion points, and the SORB joining bracket 30 is located rearward (relative to the front of the vehicle) of the FET assembly 32 with an overlapping flange design to facilitate creating additional strength and stiffness via stack-up of the FET assembly 32. This facilitates load sharing and distribution between the frame 12, underbody hold-down assembly 14, and cowl side assembly 20. The joining bracket 30 is configured to provide both additional structural integrity of the underbody hold-down assembly 14 and cowl side assembly 20, and to act as a system integrator between the frame and body systems. Combined with the FET assembly 32, the joining bracket 30 is configured to increase structural integrity in intrusion zones, thereby resulting in favorable occupant injury metrics at the foot, tibia, and femur.

Described herein are systems and methods for reinforcing a vehicle structure to reduce occupant compartment intrusion during impact events, particularly lower leg area intrusion during SORB impacts. The systems include a SORB joining bracket to couple the underbody hold-down assembly and the cowl side assembly while interlocking with a body mount assembly to increase load capacity of the system by providing a direct load path into the frame via the body mount assembly. The system further includes a FET assembly extending outboard from the frame to create a direct transfer load path from outboard loading devices into the frame. Accordingly, the described systems provide superior structural integrity between underbody and cowl side assemblies, and reduced or eliminated structural intrusion from front suspension corners, barriers, and wheel assemblies.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle having an underbody hold-down assembly, a cowl side assembly, a body mount assembly configured to connect a vehicle body to a structural vehicle frame having a side frame rail, and a wheel assembly, the vehicle comprising:
   a structural small overlap rigid barrier (SORB) joining bracket including:
      a cowl side coupling first portion configured to couple to the cowl side assembly; and
      an underbody coupling second portion configured to couple to the underbody hold-down assembly and the body mount assembly,
      wherein the SORB joining bracket couples and maintains structural integrity between the underbody hold-down assembly and the cowl side assembly, and couples with the body mount assembly to increase vehicle load capacity by providing a direct load path into the structural frame of the vehicle; and
   a frame extension tube (FET) assembly including:
      a tubular member coupled to the side frame rail and extending outboard thereof rearward of the wheel assembly, the tubular member configured to create a load carrying path for the wheel assembly into the structural frame; and
      a tension gusset coupled between the side frame rail and the tubular member to create an additional load carrying path into the structural frame.

2. The vehicle of claim 1, wherein the SORB joining bracket further comprises a main body panel extending between the first and second portions.

3. The vehicle of claim 2, wherein the SORB joining bracket further comprises a forward flange extending from the main body panel between the first and second portions to provide increased structural rigidity.

4. The vehicle of claim 3, wherein the SORB joining bracket further comprises a rearward flange extending from the main body panel between the first and second portions to provide further increased structural rigidity.

5. The vehicle of claim 2, wherein the first portion is a side flange extending from the main body panel, and the second portion is an underbody flange extending from the main body panel.

6. The vehicle of claim 5, wherein the underbody flange includes a first aperture configured to receive a first fastener for coupling the underbody flange to the underbody hold-down assembly, and a second aperture configured to receive a second fastener for coupling the underbody flange to the body mount assembly.

7. The vehicle of claim 5, wherein the side flange includes a plurality of apertures configured to each receive a fastener for coupling the side flange to the cowl side assembly.

8. The vehicle of claim 2, further comprising a first directional stiffening bead formed in the main body panel.

9. The vehicle of claim 1, wherein the tubular member is a one-piece tube.

10. The vehicle of claim 1, wherein the tubular member is generally rectangular and includes a front wall, a rear wall, a bottom wall, and a top wall.

11. The vehicle of claim 10, wherein a first end of the tubular member extends through a first aperture formed through an outboard side of the side frame rail.

12. The vehicle of claim 11, wherein the first end of the tubular member is welded to the outboard side of the side frame rail.

13. The vehicle of claim 12, wherein the front wall faces toward a front of the vehicle, and wherein the front wall is not welded to the outboard side of the side frame rail to facilitate the tubular member undergoing plastic deformation during a small overlap rigid barrier impact event.

14. The vehicle of claim 11, wherein the first end of the tubular member extends through a second aperture formed through an inboard side of the side frame rail such that the tubular member extends completely through the side frame rail.

15. The vehicle of claim 14, wherein the front wall, the rear wall, the bottom wall, and the top wall are all welded to the inboard side of the side frame rail.

* * * * *